(12) United States Patent
Biehl

(10) Patent No.: US 10,875,477 B2
(45) Date of Patent: Dec. 29, 2020

(54) LICENSE PLATE HOLDER

(71) Applicant: Michael J. Biehl, Marinette, WI (US)

(72) Inventor: Michael J. Biehl, Marinette, WI (US)

(73) Assignee: Michael J. Biehl, Marinette, WI (US)

( * ) Notice: Subject to any disclaimer, the term of this patent is extended or adjusted under 35 U.S.C. 154(b) by 0 days.

(21) Appl. No.: 16/809,315

(22) Filed: Mar. 4, 2020

(65) Prior Publication Data

US 2020/0282926 A1 Sep. 10, 2020

Related U.S. Application Data

(60) Provisional application No. 62/814,556, filed on Mar. 6, 2019.

(51) Int. Cl.
*B60R 13/10* (2006.01)
*G09F 7/18* (2006.01)

(52) U.S. Cl.
CPC .............. *B60R 13/105* (2013.01); *G09F 7/18* (2013.01); *G09F 2007/1865* (2013.01); *G09F 2007/1895* (2013.01)

(58) Field of Classification Search
CPC . B60R 13/105; B42F 7/08; G09F 7/18; G09F 2007/1865; G09F 2007/1895
See application file for complete search history.

(56) References Cited

U.S. PATENT DOCUMENTS

| | | | |
|---|---|---|---|
| 1,573,113 A | 2/1926 | Irie | |
| 3,274,723 A | 9/1966 | Jacobs | |
| 3,304,642 A | 2/1967 | Dardis | |
| 4,736,539 A | 4/1988 | Dickinson | |
| 4,762,225 A * | 8/1988 | Henkel | B65D 75/42 206/308.1 |
| 5,706,947 A * | 1/1998 | Hodges | B65D 5/42 206/214 |
| 5,870,841 A * | 2/1999 | Brody, II | B60R 13/105 40/200 |
| 9,254,703 B2 * | 2/2016 | Kuehn | B42F 7/08 |
| 2004/0111932 A1 | 6/2004 | Lee et al. | |
| 2007/0289176 A1* | 12/2007 | Anderson | G09F 7/18 40/209 |
| 2009/0211127 A1* | 8/2009 | Ogden | G09F 21/04 40/209 |
| 2011/0114710 A1* | 5/2011 | Ong | B42F 7/065 229/67.3 |
| 2012/0138666 A1* | 6/2012 | Ong | B42F 7/08 229/67.3 |
| 2013/0097900 A1* | 4/2013 | Rousey | B60R 13/105 40/209 |
| 2015/0068076 A1 | 3/2015 | Knapschaefer | |

* cited by examiner

*Primary Examiner* — Gary C Hoge
(74) *Attorney, Agent, or Firm* — Brian G. Gilpin; Godfrey & Kahn, S.C.

(57) ABSTRACT

A license plate holder allows a license plate to be temporarily attached to a vehicle without the use of tools, magnets, or suction cups. The license plate holder attaches to a vehicle where a license plate is typically attached and includes an expandable pocket into which a license plate may be inserted or removed.

11 Claims, 8 Drawing Sheets

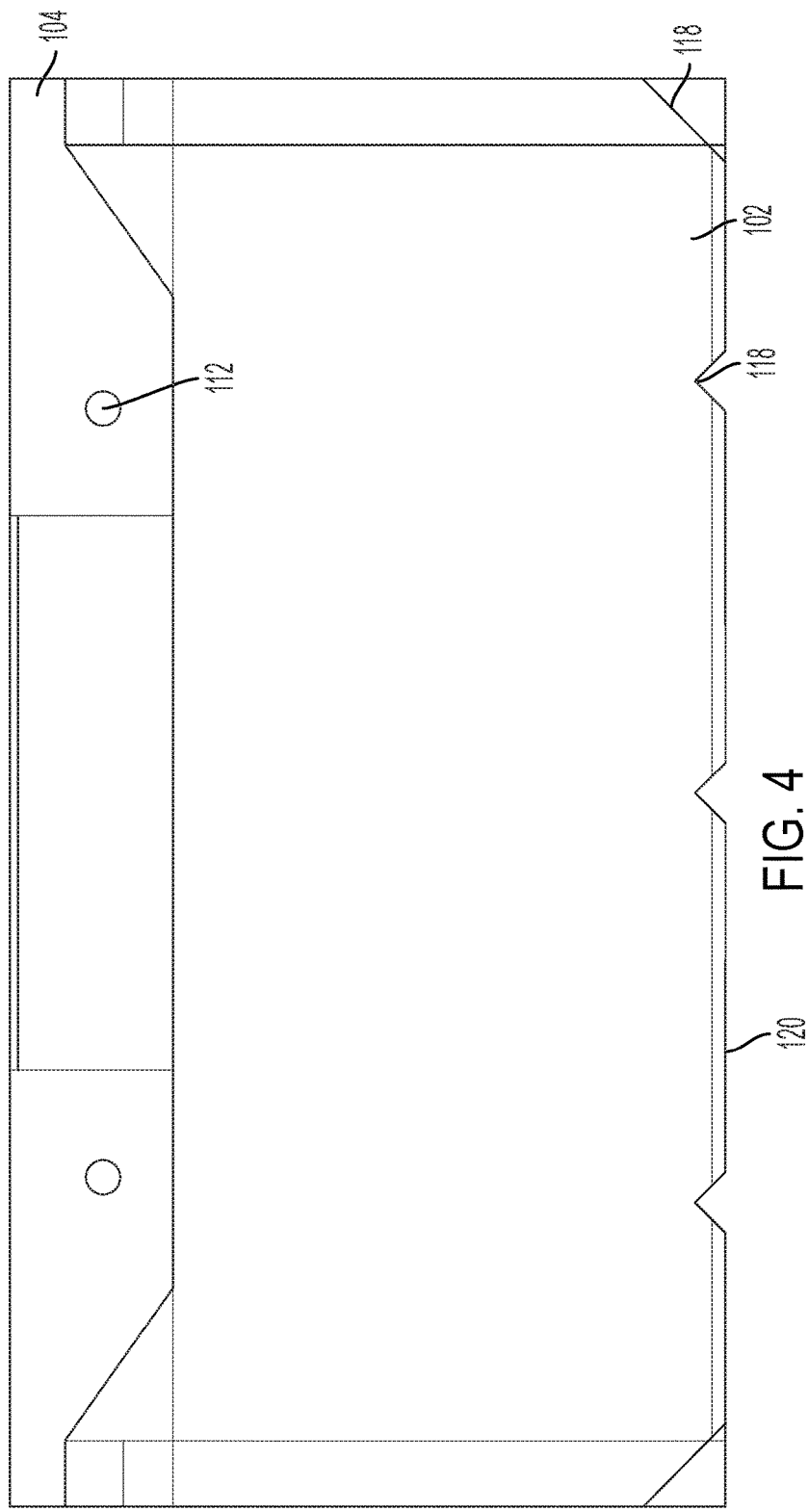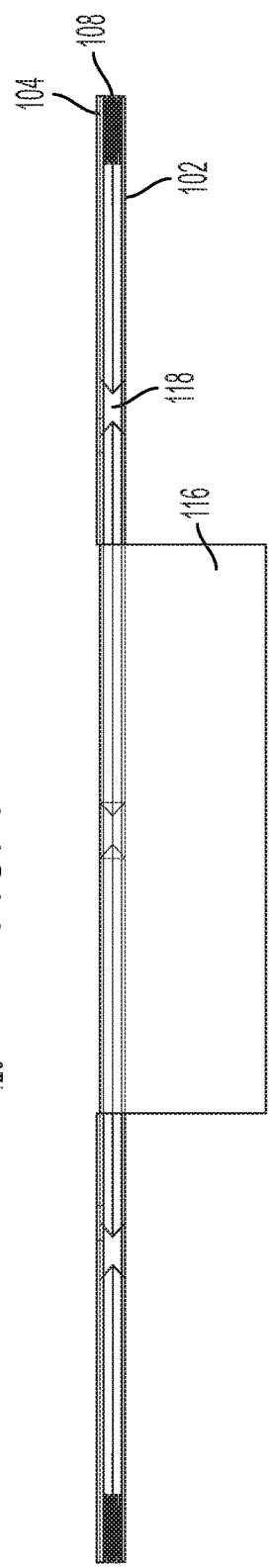

LICENSE PLATE HOLDER

CROSS-REFERENCE TO RELATED APPLICATION

This application is based on and claims priority to U.S. Provisional Patent Application No. 62/814,556 filed on Mar. 6, 2019, which is incorporated herein by reference in its entirety for all purposes.

FIELD OF THE INVENTION

The present invention relates generally to the field of license plate holders. More particularly, the present invention relates to a license plate holder that allows a user to quickly swap license plates without the use of tools.

BACKGROUND

License plates are typically attached to vehicles by screws or other semi-permanent means, such that they remain securely affixed to the vehicle for long periods of time. License plate mountings vary by manufacturer, but license plates in a given country typically have standardized mounting hole positions. However, the fasteners or other mounting hardware used to affix a license plate to a vehicle may vary from vehicle to vehicle.

In the new and used vehicle sales industry, it is often necessary to install and remove temporary license plates frequently. For example, a "dealer plate" is often temporarily affixed to an unsold vehicle during test-drives. Dealers have a limited number of such "dealer plates," so a plate may only be placed on a vehicle for a single test drive before being removed so it can be used for the next test drive. In addition, as mentioned above, the mounting hardware used to fasten a license plate to a vehicle may vary from vehicle to vehicle, meaning a salesperson may need to carry a flat head screw driver, Phillips head screw driver, a variety of nut drivers, etc., not to mention different hardware that may be required, just to be able to attach and remove license plates during the course of a single sales interaction where a customer test drives several vehicles.

Some existing solutions to the above-mentioned problems exist. For example, license plate holders incorporating magnets, suction cups, temporary thumb screws that do not require tools, and other temporary fastening means exist, but all have significant shortcomings. Magnetic holders rely on the vehicle being made of magnetic material, but many modern vehicles are made of lightweight non-magnetic materials such as aluminum, fiberglass, or carbon fiber composites. In addition, magnetic holders that attach directly to vehicle body panels may scratch delicate paint finishes. Suction cups are largely ineffective in cold climates, and thumb screws do not fit all makes and models of vehicles.

As such, there is a need for a license plate holder that allows a user to securely, but temporarily, attach a license plate to a vehicle without the use of fasteners and without the use of magnets or suction.

SUMMARY

The present invention relates to a license plate holder including: a main body including a back portion, a front portion, and a flexible portion. The back portion includes at least two mounting holes for attaching the license plate holder to a vehicle. The front portion is made of a translucent material such that a license plate or other item placed in the license plate holder is visible through the front portion. The flexible portion is attached to the front and back portions and is positioned between the front and back portions thereby forming a pocket into which a license plate may be inserted. A user can adjust the distance between the front and back portions by stretching the flexible portion to allow for easy insertion and removal of the license plate.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 4 is a front view of the license plate holder of FIG. 1;

FIG. 5 is a top view of the license plate holder of FIG. 1;

DETAILED DESCRIPTION

Figure 1:
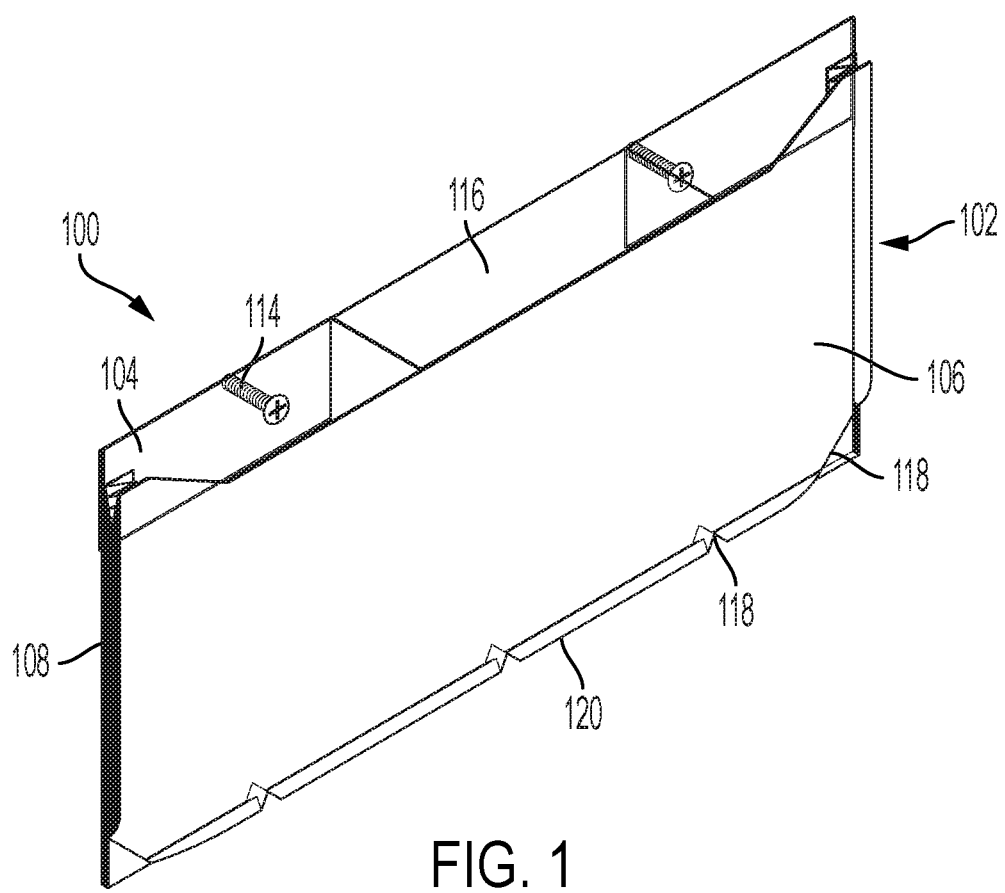
FIG. 1 is a perspective view of one embodiment of a license plate holder in accordance with the invention.

As shown in FIGS. 1-10, one embodiment of a license plate holder 100 in accordance with the invention is shown. The license plate holder 100 comprises a main body 102, wherein the main body includes a back portion 104 that may be removably attached to a vehicle 200, a front portion 106, and a flexible portion 108 disposed between the back and front portions. The front, back, and flexible portions 104, 106, 108 are attached to each other, forming a pocket 110 into which a license plate 202 may be inserted. In the embodiment shown, the front portion, back portion, and flexible portion 104, 106, 108 are ultrasonically welded together, but any suitable means of affixing the portions together may be used without departing from the invention. License plate holder 100 further includes a bottom edge 120. Bottom edge 120 is formed by attaching back portion 104 and front portion 106 together in a manner that prevents flexible portion 108 from expanding along the bottom edge.

Preventing flexible portion 108 from expanding along bottom edge 120 enhances the stability of license plate holder 100 and provides an effective pocket 110 for a license plate 202. Of course, in some embodiments it may be desirable to allow license plate holder 100 to expand along the bottom edge, which would not depart from the invention. In other embodiments, it may be desirable to form back portion 104 and front portion 106 from a continuous piece of material, with a fold in the material to form bottom edge 120.

In the embodiment shown, at least the front portion 106 of license plate holder 100 is made of durable translucent or transparent material that allows license plate 202 to be visible through the holder when the license plate is placed within the holder. Some non-limiting examples of material that may be used include acrylic (PMMA), polycarbonate (PC), polyethylene (PE), polypropylene (PP), polyethylene terephthalate (PET), polyvinyl chloride (PVC), and acrylonitrile-butadiene-styrene (ABS). In the embodiment shown, back portion 104 includes a plurality of holes 112. Each hole allows a fastener 114 to pass therethrough to attach license plate holder 100 to a vehicle 200 in the conventional fashion i.e., by attaching fasteners 114 to mounting holes (not shown) on vehicle 200 intended for the attachment of a license plate 202. In the embodiment shown, the holes 112 are positioned to align with license plate standards for North America, but any other configuration may be used without departing from the invention.

Figure 3:
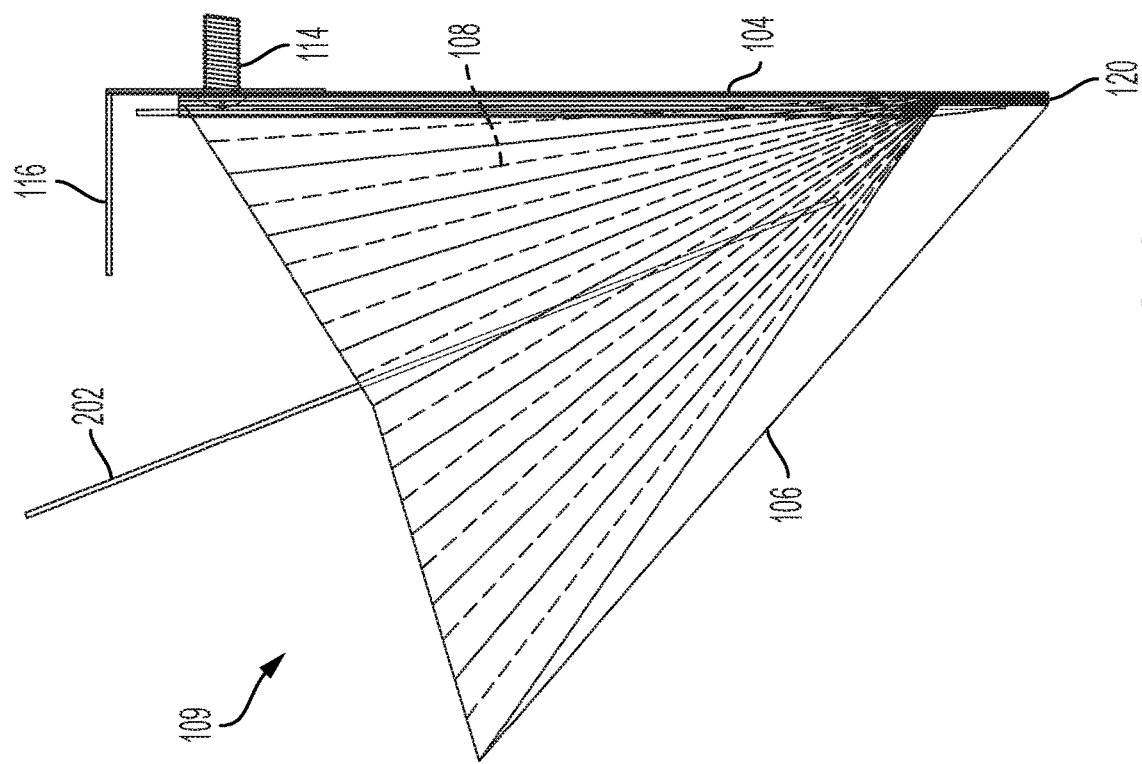
FIG. 3 is a side view of the license plate holder of FIG. 1, showing the license plate holder in an open position.
Figure 2:
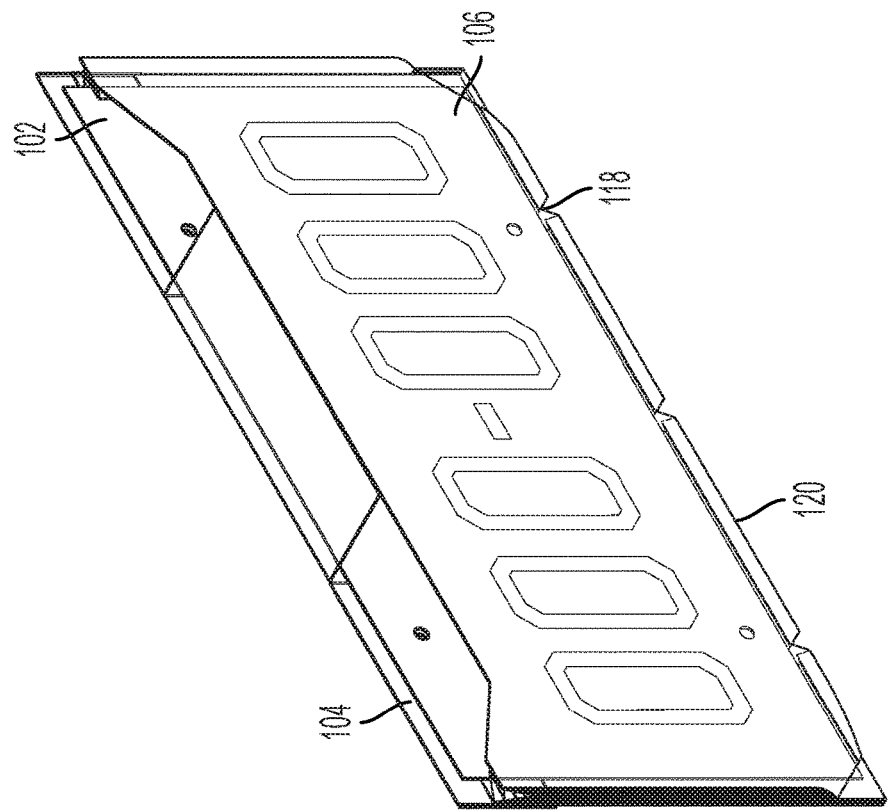
FIG. 2 is another perspective view of the license plate holder of FIG. 1 showing a license plate installed in the license plate holder.
Figure 6:
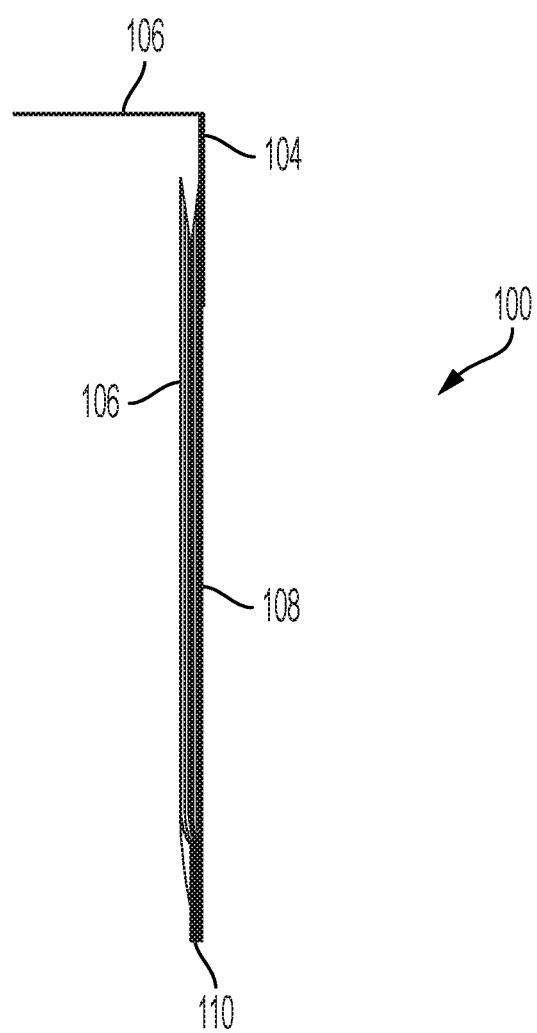
FIG. 6 is a side view of the license plate holder of FIG. 1.

FIGS. 2-3 show license plate holder 100 in greater detail. In particular, license plate holder 100 is shown in a closed position in FIG. 2 and an open position in FIG. 3. In the present embodiment, flexible portion 108 is made of the same material as back portion 104 and front portion 106, but flexible portion is pleated like an accordion file folder. Any suitable expandable section, made of any suitable material, may be used without departing from the invention, however. As shown, the elastic nature of flexible portion 108 causes licensed plate holder 100 to be biased toward the closed position. When a user 300 pulls on the front portion 106 to expand license plate holder 100 to the open position, the user can either insert or remove a license plate 202 or any other identification tag from the holder. At least one optional retaining flap 116 is positioned above pocket 110. The optional retaining flap 116 extends over opening 109 when license plate holder 100 is in the closed position to prevent the license plate 202 from inadvertently falling out of the holder while the vehicle 200 is in motion or, on vehicles where the license plate 202 is attached to a trunk lid 206 or hatchback (not shown), when the trunk or hatchback is opened.

As further shown in FIGS. 2 and 4, license plate holder 100 also includes a plurality of optional drainage cutouts 118 located along the bottom edge. The drainage cutouts 118 allow dirt, moisture and other small debris to vacate license plate holder 100. Drainage cutouts 118 may be of any suitable shape and size without departing from the invention.

Figure 7:
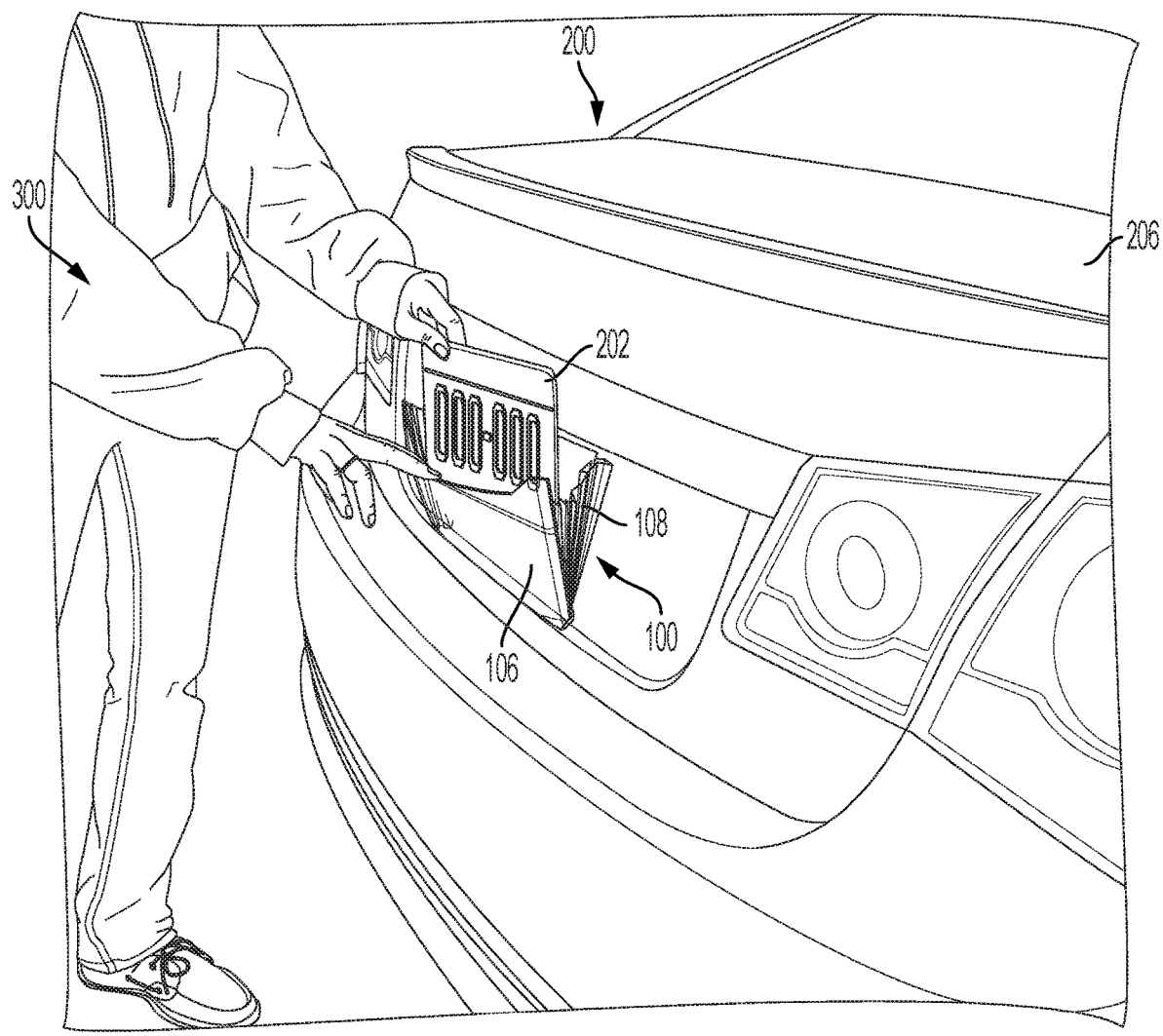
FIG. 7 is a schematic view of one embodiment of a license plate holder in accordance with the invention removably attached to a vehicle showing how a user may insert or remove a license plate from the license plate holder.
Figure 8:
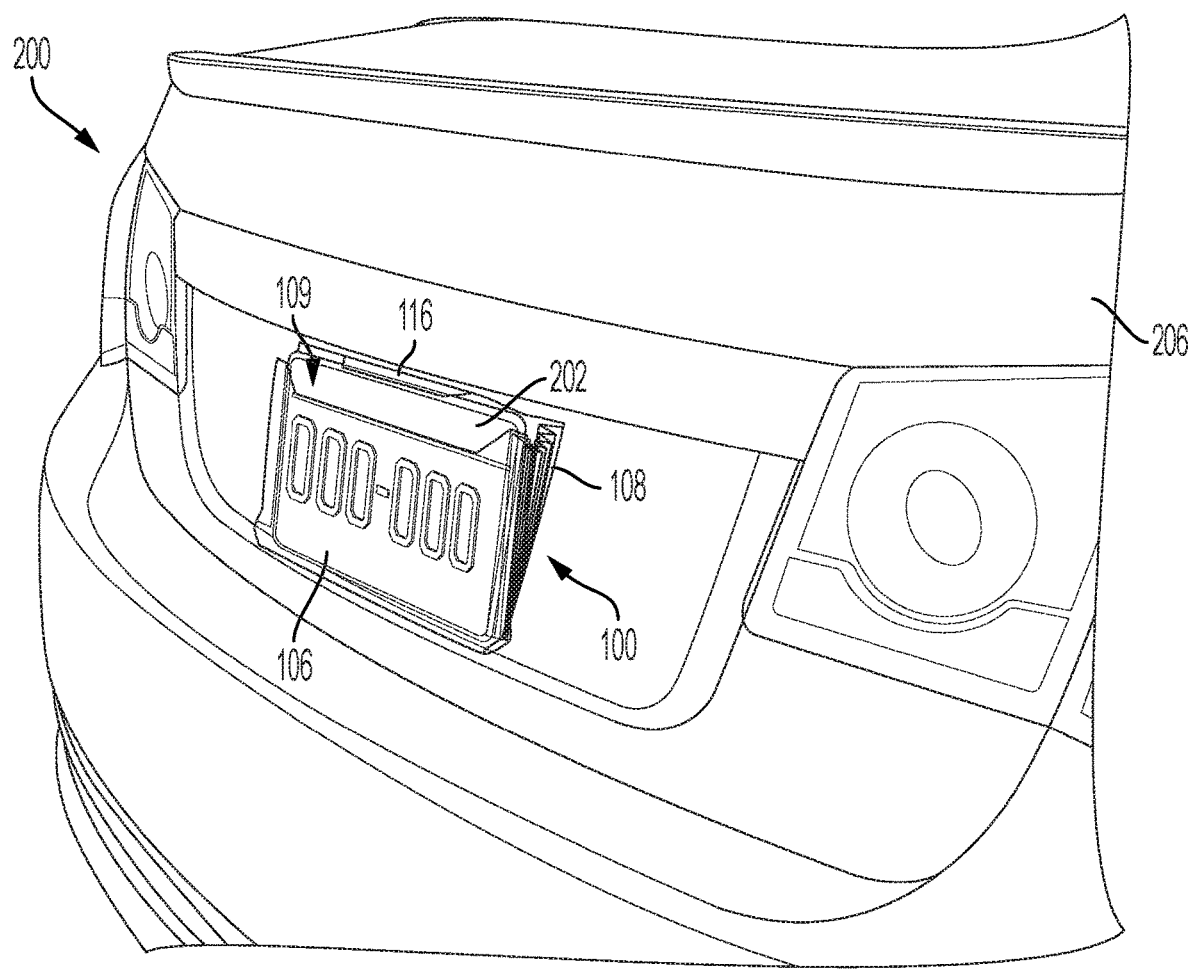
FIG. 8 is another schematic view of the license plate holder of FIG. 7 showing the license plate holder in the closed position with a license plate inside the holder.

FIGS. 7-10 are schematic drawings showing the license plate holder 100 in use. FIG. 7 shows a user 300 inserting a license plate 202 into the license plate holder 100 by pulling front portion 106 to the open position. FIG. 8 shows license plate holder 100 in the closed position, with license plate 202 installed in the holder. When license plate 202 is installed in license plate holder 100, it is plainly visible, thereby complying with regulatory requirements. FIG. 8 also clearly shows how optional retaining flap 116 is positioned above license plate 202 and at least partially covers opening 109.

Figure 9:
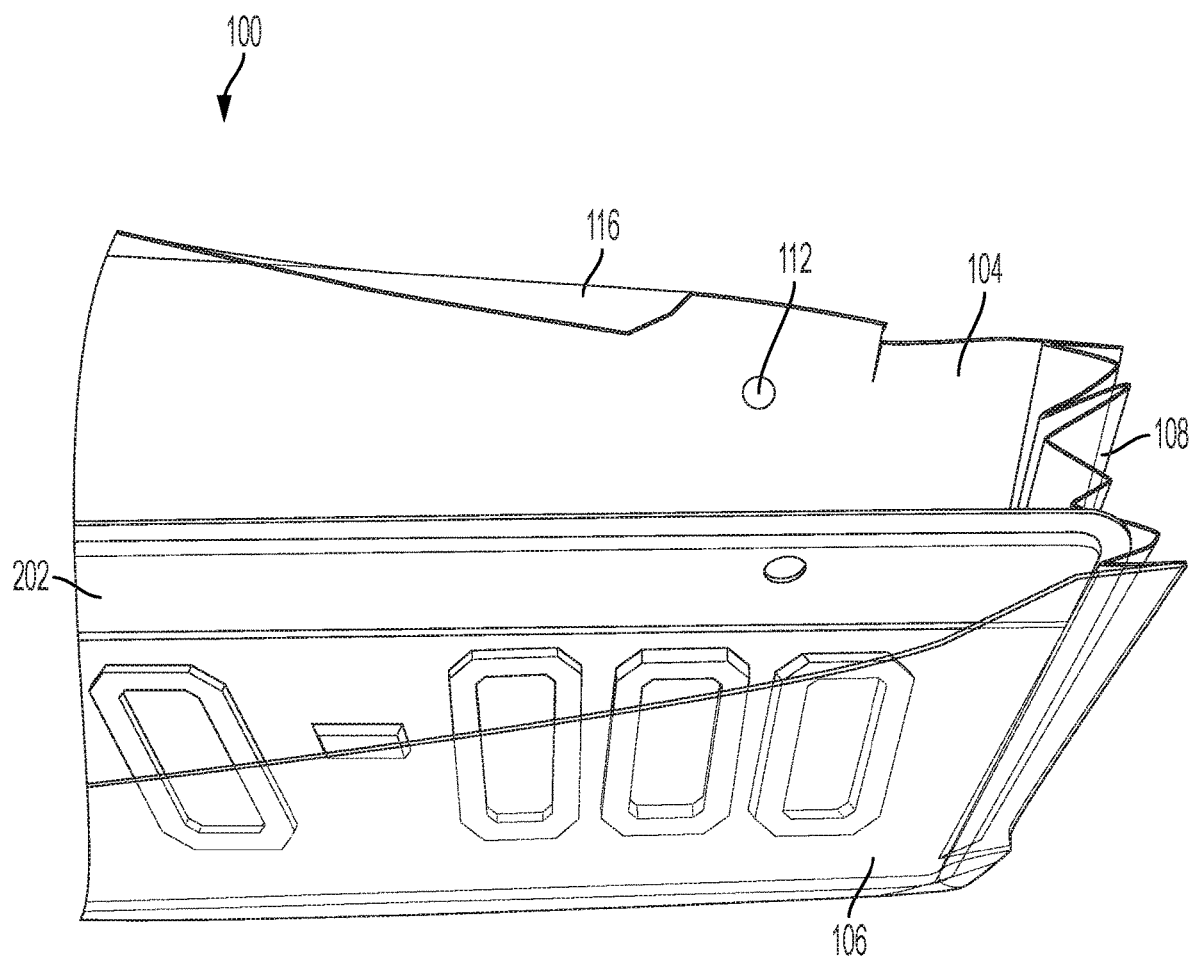
FIG. 9 is a detail schematic view of the license plate holder of FIG. 7 showing detail of the pocket formed between a front portion and a back portion of the license plate holder.

Turning now to FIG. 9, an upper corner of license plate holder 100 is shown in greater detail. As shown, license plate holder 100 is in a partially open position and a license plate 202 is installed in the holder. FIG. 9 shows how the flexible portion 108 expands, much like a file folder, to allow easy access to license plate 202.

Figure 10:
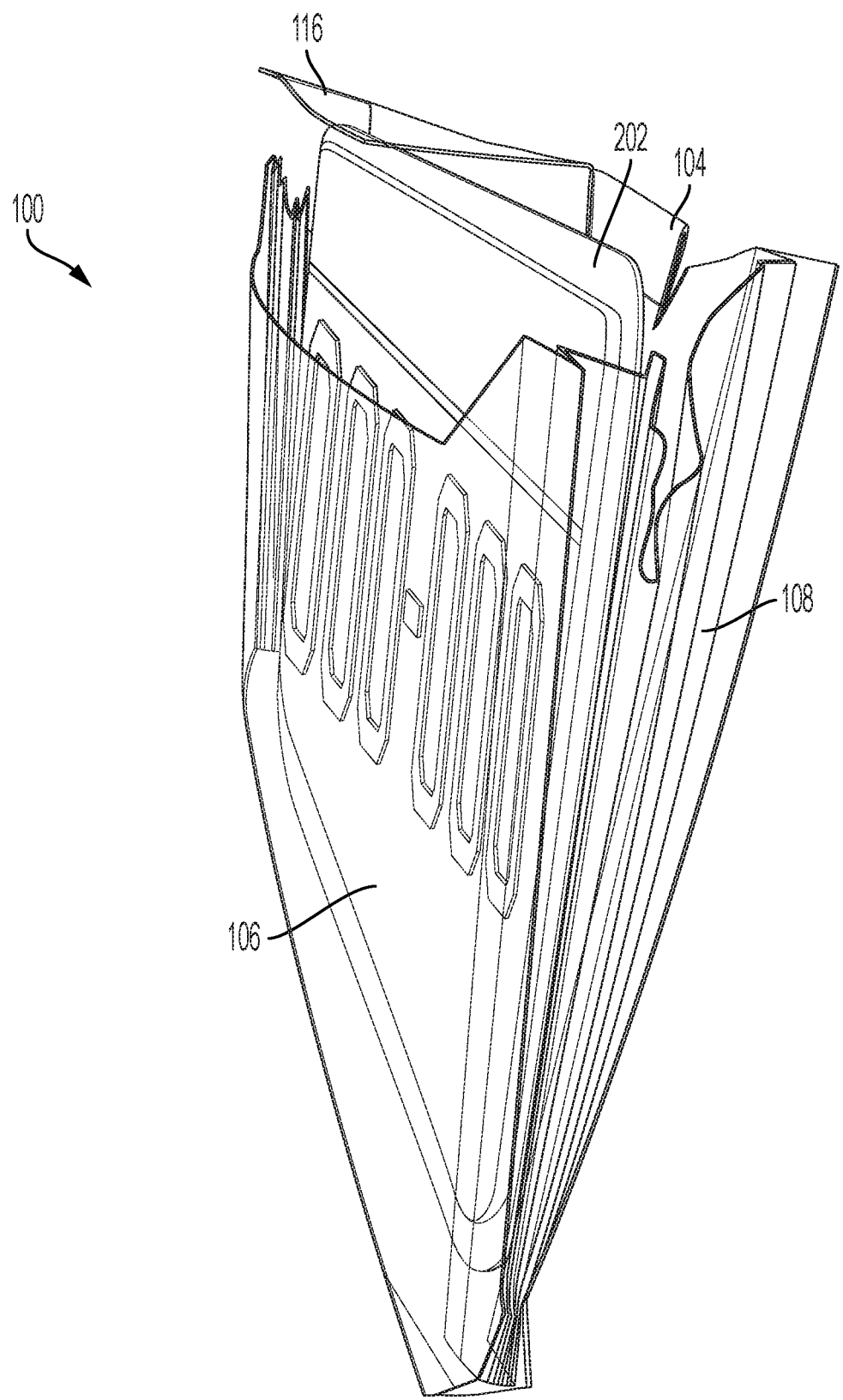
FIG. 10 is another schematic view of the license plate holder of FIG. 7 showing detail of the side and front of the license plate holder.

FIG. 10 shows another detail view of license plate holder 100, showing a typical configuration of the holder when a license plate 202 is installed in the holder. As shown, flexible portion 108 may be deformed slightly to accommodate the position of license plate 202.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A license plate holder comprising:
    a main body including a back portion, a front portion, and a flexible portion;
    the front portion made of material allowing a license plate placed in the license plate holder to be visible through the front portion;
    the flexible portion attached to the front and back portions and positioned therebetween, the front portion, back portion, and flexible portion forming an opening and a pocket into which the license plate may be inserted; and
    wherein the license plate holder has an open and a closed position, the license plate holder biased toward the closed position.

2. The license plate holder of claim 1, wherein the back portion including at least two mounting holes for attaching the license plate holder to a vehicle.

3. The license plate holder of claim 1, wherein a user can adjust the distance between the front and back portions by stretching the flexible portion.

4. The license plate holder of claim 1, wherein a retaining flap is attached to the back portion and positioned such that the flap extends at least partially over the pocket when the license plate is inserted in the license plate holder.

5. The license plate holder of claim 1, wherein the flexible portion comprises a pleated material.

6. The license plate holder of claim 1 further including at least one drainage cutouts positioned to allow debris to drain out of the license plate holder.

7. The license plate holder of claim 1, wherein the main body includes a bottom edge positioned at an edge opposite that of the opening, the bottom edge restricting the license plate holder from expanding along the bottom edge.

8. The license plate holder of claim 7, wherein the bottom edge is formed by attaching the front portion to the back portion.

9. The license plate holder of claim 7, wherein front portion and the back portion are formed from one continuous piece of material and wherein the bottom edge is formed by folding the continuous piece of material.

10. The license plate holder of claim 1, wherein the flexible portion is attached to the front portion and the back portion by ultrasonic welding.

11. A license plate holder comprising:
    a main body including a back portion, a front portion, and a flexible portion;

the front portion made of material allowing a license plate placed in the license plate holder to be visible through the front portion;

the flexible portion attached to the front and back portions and positioned therebetween, thereby forming an opening and a pocket into which the license plate may be inserted;

the main body further including a bottom edge positioned at an edge opposite the opening;

the bottom edge restricting the license plate holder from expanding along the bottom edge; and wherein the license plate holder has an open and a closed position, the license plate holder biased toward the closed position.

* * * * *